(12) United States Patent
Maruyama

(10) Patent No.: US 10,859,788 B2
(45) Date of Patent: Dec. 8, 2020

(54) LENS CONTROL APPARATUS AND CONTROL METHOD THEREOF

(71) Applicant: CANON KABUSHIKI KAISHA, Tokyo (JP)

(72) Inventor: Naoki Maruyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/604,401

(22) Filed: May 24, 2017

(65) Prior Publication Data

US 2017/0343765 A1 Nov. 30, 2017

(30) Foreign Application Priority Data

May 31, 2016 (JP) .................................. 2016-109445
Mar. 16, 2017 (JP) .................................. 2017-051819

(51) Int. Cl.
*G02B 7/02* (2006.01)

(52) U.S. Cl.
CPC ............. *G02B 7/028* (2013.01); *G02B 7/023* (2013.01)

(58) Field of Classification Search
CPC ................................ G02B 7/028; G02B 7/023
USPC ........................................................ 359/820
See application file for complete search history.

(56) References Cited

U.S. PATENT DOCUMENTS

| 4,557,567 A * | 12/1985 | Azumi ..................... G02B 7/04 359/683 |
| 5,117,769 A * | 6/1992 | deBoer ................... B05C 11/08 118/500 |
| 5,895,129 A * | 4/1999 | Ohta ....................... G02B 7/102 396/79 |
| 7,278,745 B2 * | 10/2007 | Engle ..................... G03B 21/142 353/122 |
| 2001/0019450 A1* | 9/2001 | Ogino .................. H04N 13/296 359/462 |
| 2006/0076493 A1* | 4/2006 | Bluzer ..................... G01J 5/08 250/338.1 |

FOREIGN PATENT DOCUMENTS

| CN | 1928602 A | 3/2007 |
| CN | 101806952 A | 8/2010 |
| CN | 205049804 U | 2/2016 |
| CN | 105407343 A | 3/2016 |
| JP | 2003-232986 A | 8/2003 |
| JP | 2013-218160 A | 10/2013 |
| WO | 2006/069040 A2 | 6/2006 |

* cited by examiner

*Primary Examiner* — James R Greece
(74) *Attorney, Agent, or Firm* — Canon U.S.A., Inc., IP Division

(57) ABSTRACT

In an imaging apparatus, a control unit controls driving of a lens based on a correction amount calculated from a temperature change acquired by a temperature detection unit and a correction coefficient of the lens.

23 Claims, 14 Drawing Sheets

NORMAL TEMPERATURE

WHEN MOVED TO THE RIGHT
BLACK FILLED AREA:
MECHANICAL CLEARANCE

LOW TEMPERATURE

CONTRACT BUT
DO NOT INTERFERE
WITH EACH OTHER

HIGH TEMPERATURE

EXPAND AND
JOSTLE (INTERFERE)
WITH EACH OTHER

LENS CONTROL APPARATUS AND CONTROL METHOD THEREOF

BACKGROUND OF THE INVENTION

Field of Invention

The present invention generally relates to lens control of an imaging lens apparatus, and in particular it relates to correction of lens defocusing caused by temperature changes, and to a control method thereof.

Description of Related Art

Deformation of a lens barrel by temperature change has been known as a cause of a positional deviation of a focus lens in an imaging apparatus such as a camera.

In Japanese Patent Application Laid-Open No. 2003-232986, a correction value of a position corresponding to an infinity distance position of the focus lens is obtained based on a temperature, a zoom ratio, and temperature correction data of a focus lens position with respect to the zoom ratio. Then, focus lens driving control is executed based on the thus obtained correction value and the position corresponding to the infinity distance position of the focus lens. Through the above-described technique, a positional deviation of the focus lens caused by temperature change can be corrected.

However, there are various issues raised in the technique described in Japanese Patent Application Laid-Open No. 2003-232986.

For example, Japanese Patent Application Laid-Open No. 2003-232986 lacks consideration of the fact that expansion and contraction of certain materials vary depending on whether a temperature has reached certain degrees after a rise or a fall, and a positional deviation of the focus lens also varies depending on how expansion and contraction of the member have occurred. Accordingly, the following issue arises in the technique described in Japanese Patent Application Laid-Open No. 2003-232986.

More specifically, even though the temperature has reached the same degrees, for example, between the cases where the temperature has reached 25° C. from 0° C. and where the temperature has reached 25° C. from 50° C., there can be a case where defocusing caused by a positional deviation of the focus lens may or may not be thoroughly corrected.

Further, for example, even if a positional deviation of one focus lens can be corrected with high precision, there can be a case where a positional deviation of another focus lens cannot be thoroughly corrected. This is because consideration is not given to the fact that a positional deviation of the focus lens may vary depending on how expansion and contraction of the member occur in each different lens.

SUMMARY OF THE INVENTION

The present invention is directed to a lens control apparatus capable of executing lens control by which defocusing caused by temperature change is corrected to a focusing state which is much closer to the original focusing state, and a control method thereof.

According to an aspect of the present invention, A lens control apparatus, comprising a temperature detection unit configured to detect temperature, a first calculation unit configured to calculate a temperature change amount from a plurality of temperatures detected by the temperature detection unit, a storage unit configured to store coefficient data according to a lens, a second calculation unit configured to calculate a correction amount based on a calculation result of the first calculation unit and a coefficient stored in the storage unit, and a lens control unit configured to control lens driving of the lens based on the correction amount.

Further features of the present invention will become apparent from the following description of exemplary embodiments with reference to the attached drawings.

DESCRIPTION OF THE EMBODIMENTS

Hereinafter, preferred exemplary embodiments of the present invention will be described in detail with reference to the appended drawings.

Figure 2:
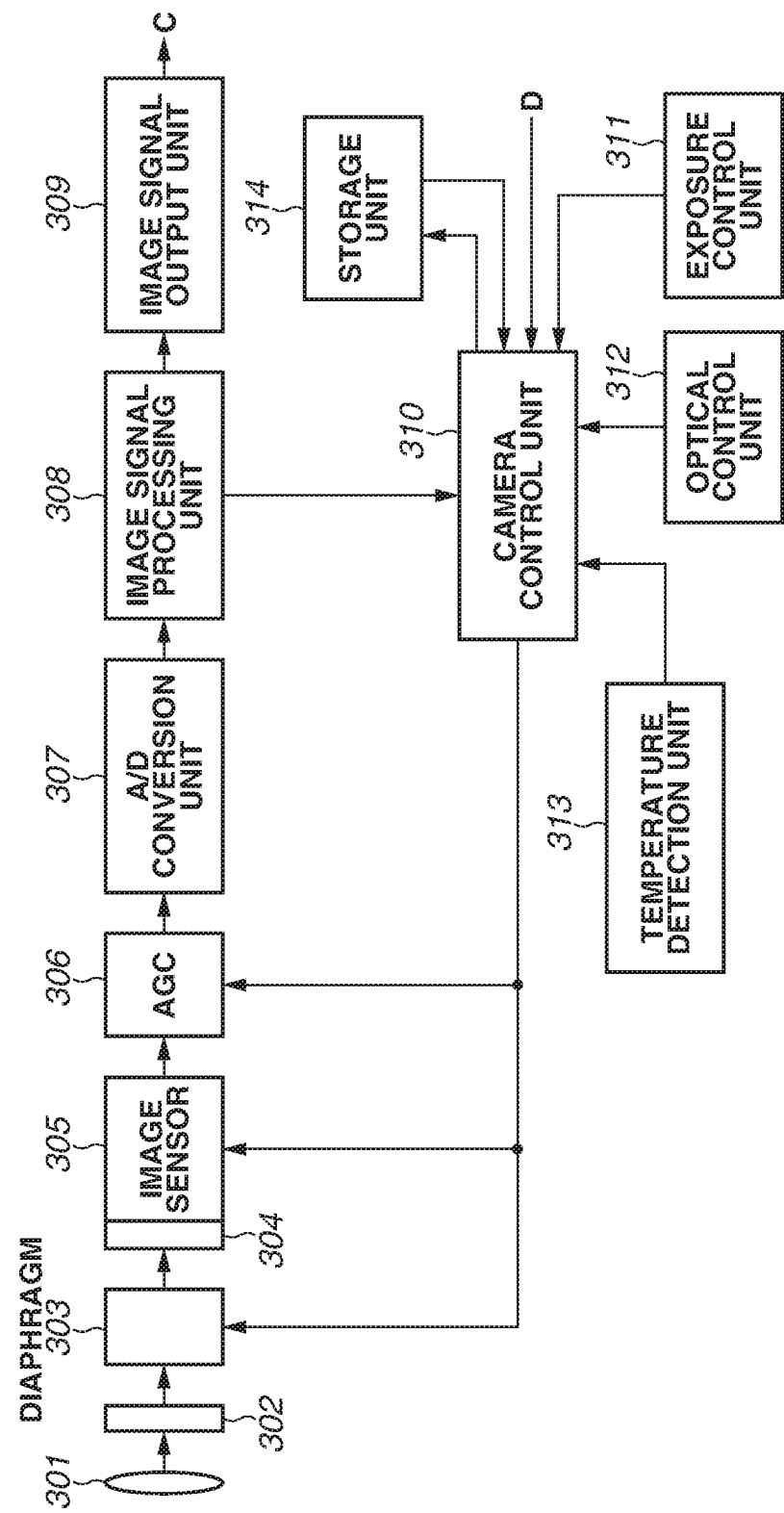
FIG. 2 is a diagram illustrating a configuration example of an imaging apparatus.

FIG. 2 is a block diagram illustrating a basic configuration example of an imaging apparatus according to an exemplary embodiment of the present invention. In a first exemplary embodiment, although an imaging apparatus including a lens integrally attached thereto will be described as an example, the lens may be detachably attached to the imaging apparatus. Further, although a monitoring camera is assumed in the present exemplary embodiment, the present exemplary embodiment is also applicable to a camera other than the monitoring camera.

In FIG. 2, a lens group 301 is an optical system for focusing light received from an scene onto an image sensor 305.

The lens group 301 includes a focus lens for adjusting the focus on an object within the scene and a zoom lens for adjusting a view angle of the scene.

The light that enters a camera through the lens group 301 passes through an optical filter 302. An amount of light incident on the image sensor 305 is adjusted by a diaphragm 303.

As the optical filter 302, for example, an infrared cut filter (IRCF) is provided.

The thusly adjusted light amount (image information) passes through a color filter 304 arranged in a predetermined order at each pixel of a light receiving surface of the image sensor 305, and is received by the image sensor 305.

The image sensor 305 outputs captured image information of an imaging target as an analog signal.

An automatic gain control (AGC) circuit 306 executes gain control of an analog image signal of the image formed on the image sensor 305 to adjust luminance of the image, and an analog/digital (A/D) conversion unit 307 converts the analog image signal to a digital image signal.

An image signal processing unit 308 executes predetermined processing on the digital image signal received from the A/D conversion unit 307 to output a luminance signal and a color signal of each pixel, so as to generate an output image and parameters for executing camera control.

Examples of the parameters for executing camera control include parameters used for exposure control, such as aperture control, focus control, and white balance control for adjusting color tone.

An image signal output unit 309 outputs an image signal C generated by the image signal processing unit 308 to an external apparatus (not illustrated) via a wired or wireless network (not illustrated).

A camera control unit 310 executes camera control based on the camera control parameters acquired from the image signal processing unit 308. Further, the camera control unit 310 executes camera control based on a camera control signal D received from an external apparatus (not illustrated) via a wired or wireless network (not illustrated).

The camera control unit 310 includes an exposure control unit 311, an optical control unit 312, and a storage unit 314. The storage unit 314 stores a correction parameter described below. Further, the storage unit 314 can store temperatures detected by a temperature detection unit 313 described below. The exposure control unit 311 calculates luminance information of the captured image from a luminance signal output from the image signal processing unit 308 and controls the diaphragm 303 and the AGC 306 in order to adjust the captured image to a desired luminance.

The camera control unit 310 further adjusts an accumulation time of the image sensor 305 by adjusting a shutter speed to adjust the luminance.

In a focusing operation, the camera control unit 310 extracts a high-frequency component from the image signal generated by the image signal processing unit 308 and uses a value of the high-frequency component as focus information (autofocus (AF) evaluation value). In other words, in the present exemplary embodiment, focus detection using a so-called contrast detection method is executed. Alternatively, focus detection may be executed through a phase difference detection method.

The camera control unit 310 then sets a focus lens position to make an AF evaluation value be a maximum value, and the optical control unit 312 controls the lens group 301.

The temperature detection unit 313 detects a temperature of the camera and transmits the temperature data to the camera control unit 310. A plurality of sensors may be used for detecting the temperature of the camera. For example, the sensors may be respectively arranged in a vicinity of a leading end of a lens barrel and a vicinity of the image sensor 305. In this case, an appropriate temperature may be calculated based on the temperatures detected by both of the sensors, or a temperature may be selected from any one of the detected temperatures.

Then, based on the temperature data, the camera control unit 310 calculates a correction amount for a deviation of the focus position caused by the temperature and executes focus position correction. In the present exemplary embodiment, because the imaging apparatus including a lens integrally attached thereto is assumed, the camera control unit 310 may acquire the below-described correction parameter from the storage unit 314, which is a non-volatile memory, to calculate the correction amount.

A specific example of processing in which a focus position correction amount is changed according to a tendency of temperature change will be described with reference to FIG. 1.

Figure 1:
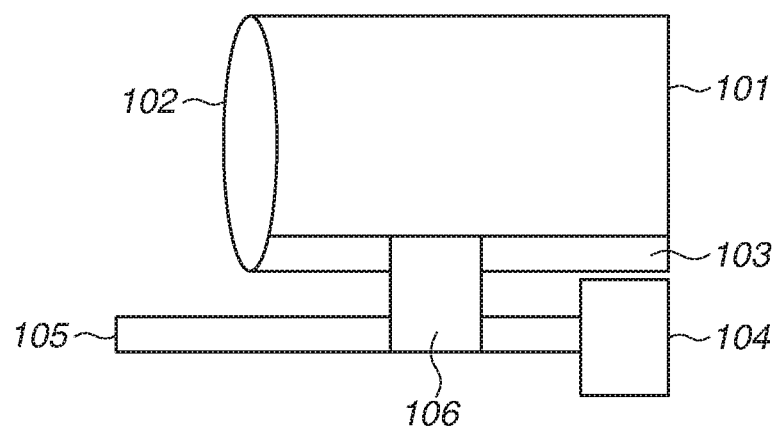
FIG. 1 is a schematic diagram illustrating a lens barrel.

FIG. 1 is a schematic diagram of a general lens barrel.

A lens barrel 101 in FIG. 1 includes a lens 102.

A screw 105 and a rack 106 engage with each other whereby the lens 102 held by a slide bar 103 moves back and forth in an optical axis direction by a driving force of a lens driving motor 104.

<Issue of Defocusing Due to Temperature Changes>

In the engagement between the screw 105 and the rack 106, there are threads on each element with a tolerance therebetween. This tolerance causes a deviation in the focus lens position, as a mechanical clearance, and has an influence on the focus control of the camera.

The issue of tolerance or mechanical clearance will be described in more detail with reference to FIGS. 7A to 7C. For example, after a focus lens (not illustrated) is moved to adjust a focus position, as illustrated in FIG. 7A, the engagement between the screw 105 and the rack 106 shifts on a side in a driving direction of the screw 105.

Figure 7A:
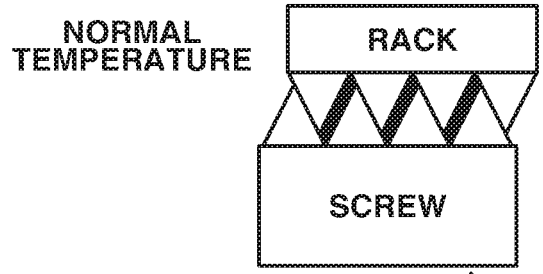
FIGS. 7A, 7B and 7C illustrate exemplary causes of defocusing addressed by the various embodiments described herein.
Figure 7B:
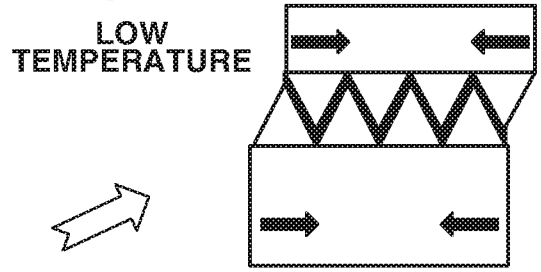
Figure 7C:
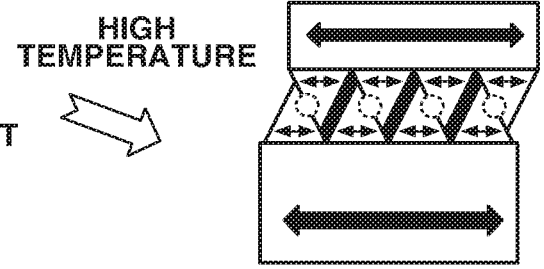

FIGS. 7B and 7C illustrate examples of a case where a temperature change occurs in the state illustrated in FIG. 7A.

For example, if a temperature is changed to a higher temperature, the screw 105 and the rack 106 expand as illustrated in FIG. 7C, so that the position of the lens attached to the rack 106 is also changed.

Further, as illustrated in FIG. 7C, the screw 105 and the rack 106 interfere and jostle with each other at a fitting portion therebetween because of the expansion due to heat. The focus position thus deviates further.

On the other hand, as illustrated in FIG. 7B, if a temperature is changed to a lower temperature, the screw 105 and the rack 106 contract. Because of the contraction, a position of the focus lens attached to the rack 106 is also changed.

However, as illustrated in FIG. 7B, the screw 105 and the rack 106 contract and therefore do not interfere or jostle with each other at the engagement. As a result, a deviation for only an amount of contraction due to heat occurs in the focus position.

As described above, defocusing caused by temperature change occurs in different manners depending on whether the temperature has reached the current temperature after the members has expanded at high temperature or contracted at low temperature.

On the other hand, in the conventional technique, although correction has been executed according to an absolute temperature at a certain timing, a temperature prior to that timing is not taken into consideration. Therefore, focus position correction in which whether a temperature prior to the current temperature is higher or lower than the current temperature is taken into consideration cannot be executed.

As described above, with the focus position correction method which only executes unique correction according to an absolute temperature at a certain timing, there can be a case where lens control cannot be executed in a manner such that defocusing caused by temperature change is corrected to a focusing state much closer to the original focusing state.

<Flowchart of Focus Position Correction>

Hereinafter, focus position correction according to the present exemplary embodiment will be described with reference to FIG. 3. As described above with reference to FIG. 2, FIG. 3 is a flowchart illustrating focus position correction processing executed according to whether a temperature prior to one temperature at a certain timing is higher or lower than the one temperature.

First, in step S401, the camera control unit 310 drives the lens to adjust a focus position on an object as an imaging target.

Then, in step S402, the temperature detection unit 313 (temperature detection circuit) detects a temperature of the camera.

Next, in step S403, the camera control unit 310 determines whether a tendency of temperature change (increase or decrease) exists, by using the temperature detected in step S402. In the present exemplary embodiment, the tendency of temperature change refers to a tendency of how the temperature has changed to reach the current temperature. For example, when the temperature has risen to reach the current temperature, the camera control unit 310 judges the tendency of temperature change as a tendency toward a rise in temperatures.

As an example method of detecting the tendency of temperature change, the camera control unit 310 may compare the current temperature with a past temperature and judges that the temperature has a tendency to rise if the current temperature is higher than in the past. In this case, the past temperature to be compared to the current temperature is a temperature detected in step S402 of a given number of times before or a temperature detected at given times ago.

Further, the camera control unit 310 may judge continuity of a rise or a fall in temperatures and judges the temperature having the continuity as the tendency of temperature change.

Further, the camera control unit 310 (detection unit) may detect whether the temperature rises or falls at respective temperature detection times in a certain period (also referred to as a "first period") and judge, based on detection results of rises and falls in temperatures, the one acquired more frequently as the tendency of temperature change. For example, if detection results of rises in temperatures are acquired more frequently than detection results of falls in temperatures, the camera control unit 310 judges the tendency of temperature change as a tendency toward a rise in temperatures. If detection results of falls in temperatures are acquired more frequently than detection results of rises in temperatures, the camera control unit 310 judges the tendency of temperature change as a tendency toward a fall in temperatures. In this case, the above period is a period between a detection time of detecting a temperature in the past and a detection time of detecting the current temperature. In this period, temperature detection is executed at a plurality of different times.

Alternatively, the camera control unit 310 may calculate a primary expression using data of a plurality of temperatures including the current temperature and temperatures detected in the past and data of detection time and judge whether the temperature has a tendency to rise or fall based on the inclination.

On the other hand, if the processing in step S402 is executed first time, for example, the camera control unit 310 refers to a temperature at a time of starting the power supply, and compares the temperature with the current temperature detected in step S402.

In step S403, if the camera control unit 310 judges the tendency of temperature change as a tendency toward a rise in temperatures (YES in step S403), the processing proceeds to step S405. In step S405, the camera control unit 310 calculates a focus position correction amount C for a rise in temperatures.

On the other hand, in step S403, if the camera control unit 310 judges the tendency of temperature change as a tendency toward a fall in temperatures (NO in step S403), the processing proceeds to step S404. In step S404, the camera control unit 310 (acquisition means) calculates a focus position correction amount C for a fall in temperatures.

For example, the focus position correction amount C can be calculated by the following conversion formula.

Focus Position Correction Amount $C=(\Delta T \times K)/\text{ppm}$

In the above conversion formula, "$\Delta T$" represents a temperature change amount, and "K" represents a correction coefficient that is changed according to a rise or a fall in temperatures. Herein, it is assumed that a pulse motor is used for controlling a lens driving amount, and "ppm" represents an amount of change per pulse. In the present exemplary embodiment, the focus position correction amount C is acquired as a pulse that is a unit of lens driving in the present exemplary embodiment, although focus position correction is not limited to only units of lens driving.

If the temperature change amount $\Delta T$ is the same, the correction coefficient K becomes different in steps S404 and S405.

The correction coefficient K may be changed at each temperature range by setting a threshold value. For example, a threshold value may be set as 25° C., and different correction coefficients K are used for the temperature change from 26° C. to 55° C. and the temperature change from −4° C. to 25° C., although the temperature change is 29° C. in both of the above cases.

Alternatively, a positive or a negative of the correction coefficient K may be changed when the temperature rises or falls.

Further, as illustrated in FIGS. 7A to 7C, because an interference direction of the screw 105 and the rack 106 is changed according to a lens driving direction, the correction coefficient K may be changed by taking the lens driving direction into consideration. For example, in FIG. 7A, the screw 105 is in contact with the rack 106 on the right side of the screw 105 with a mechanical clearance on the left side of the screw 105. In this case, as illustrated in FIG. 7C, the screw 105 and the rack 106 both expand under the high temperature, so that the rack 106 is eventually pushed by the screw 105 in a direction towards the right-hand side. Accordingly, focus position correction is executed in the left-hand side direction.

On the other hand when the screw 105 is in contact with the rack 106 on the left side of the screw 105, a mechanical clearance exists on the right side of the screw 105 (not illustrated). Then, when the screw 105 and the rack 106 both expand due to an increase in temperature, the rack 106 is eventually pushed by the screw 105 in the left-hand side direction. Accordingly, focus position correction is executed in the right-hand side direction.

As described above, because a shifting direction is changed depending on whether the screw 105 and the rack 106 are moved to the right or the left, a correction direction may be changed between steps S404 and S405, e.g., a positive or a negative of the correction coefficient K is changed.

Then, the camera control unit 310 (lens control means) controls lens driving to shift the focus position adjusted by the focus adjustment in step S401 by the focus position correction amount C based on the tendency of temperature change calculated in step S404 or S405. In step S406, through the above processing, defocusing caused by temperature change is corrected.

After the processing in step S406, the processing returns to step S402, and processing in steps S402 to S406 is repeated. Because focus position correction is repeatedly executed by constantly detecting temperatures, defocusing caused by temperatures can be corrected as appropriate.

Variation Example

In a case of a camera, such as a single-focus camera which cannot execute focus position correction, a focus position cannot be shifted by an amount corresponding to the correction amount because focus driving cannot be executed.

In such a case, defocusing caused by temperature change is corrected by an aperture operation. Specifically, a change amount for narrowing down an aperture is calculated from the calculated focus position correction amount in the flowchart, and focus position correction is executed using the aperture change amount as the focus position correction amount.

Because of the following reason, the focus position correction can be executed using the aperture. Conventionally, it has been known that an in-focus area can be widened or a depth can be increased by narrowing down the aperture, so that defocusing can be solved by increasing the depth.

Therefore, correction can be executed by controlling the aperture even if the focus cannot be controlled.
<Effect of First Exemplary Embodiment>

As described above, in the present exemplary embodiment, a different focus position correction amount C is calculated according to whether the tendency of temperature change is a tendency toward a rise in temperatures, and focus position correction is executed using the calculated focus position correction amount C.

By executing the above-described processing, even in a case where defocusing occurs in different manners depending on the tendency of temperature change, it is possible to execute lens control by which defocusing caused by temperature change is corrected to a focusing state much closer to the original focusing state.

In the first exemplary embodiment, an exemplary embodiment has been described by taking a camera including a non-interchangeable lens as an example. On the contrary, in a second exemplary embodiment, focus position correction of a camera system to which optical members including a lens group 301 can be detachably attached will be described. An optical filter, such as a neutral density (ND) filter or an infrared (IR) cut filter, and a dome used for a monitoring camera can be given as examples of changeable optical members, in addition to the lens group 301. The second exemplary embodiment will be described by taking the lens group 301 as a specific example of the changeable optical member.

In addition, description of the configuration different from the first exemplary embodiment will be mainly given while description of the configuration common thereto is omitted.
<Issue Addressed in Second Exemplary Embodiment>

The following issue is described in the first exemplary embodiment: a member expands and contracts depending on a tendency of temperature change and various defocusing therefore occur. However, there can be a case where because of difference in materials and configurations of the optical member, expansion and contraction of the optical member may not be uniform, and an amount of defocusing caused by temperatures may be thus varied. Therefore, it is necessary to calculate an appropriate correction amount according to characteristics, such as a material and a configuration of the optical member to be replaced.

In the present exemplary embodiment, a camera detects attachment of the lens and acquires lens data. Then, the focus position correction amount C is calculated using the lens data.
<Selection of Parameters>

Figure 4:
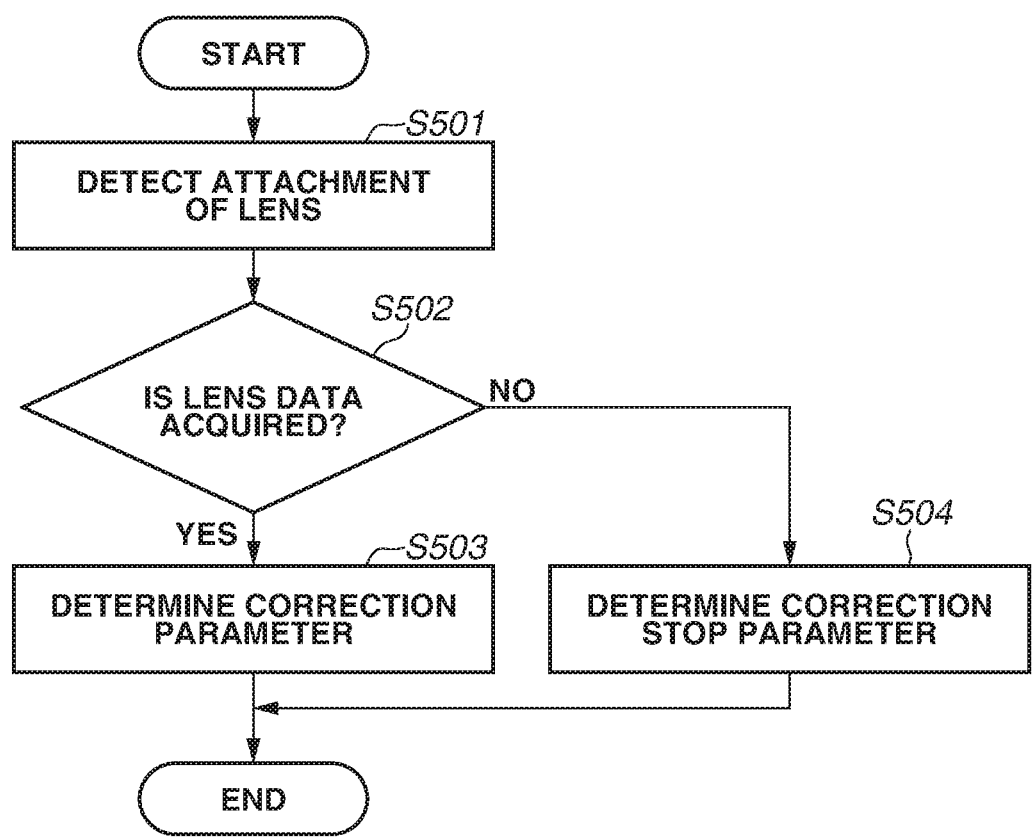
FIG. 4 is a flowchart illustrating selection processing of a focus position correction parameter (correction coefficient K) according to a second exemplary embodiment.

FIG. 4 is a flowchart illustrating a selection processing flow of a focus position correction parameter (correction coefficient K) in the interchangeable lens-type camera system.

Figure 3:
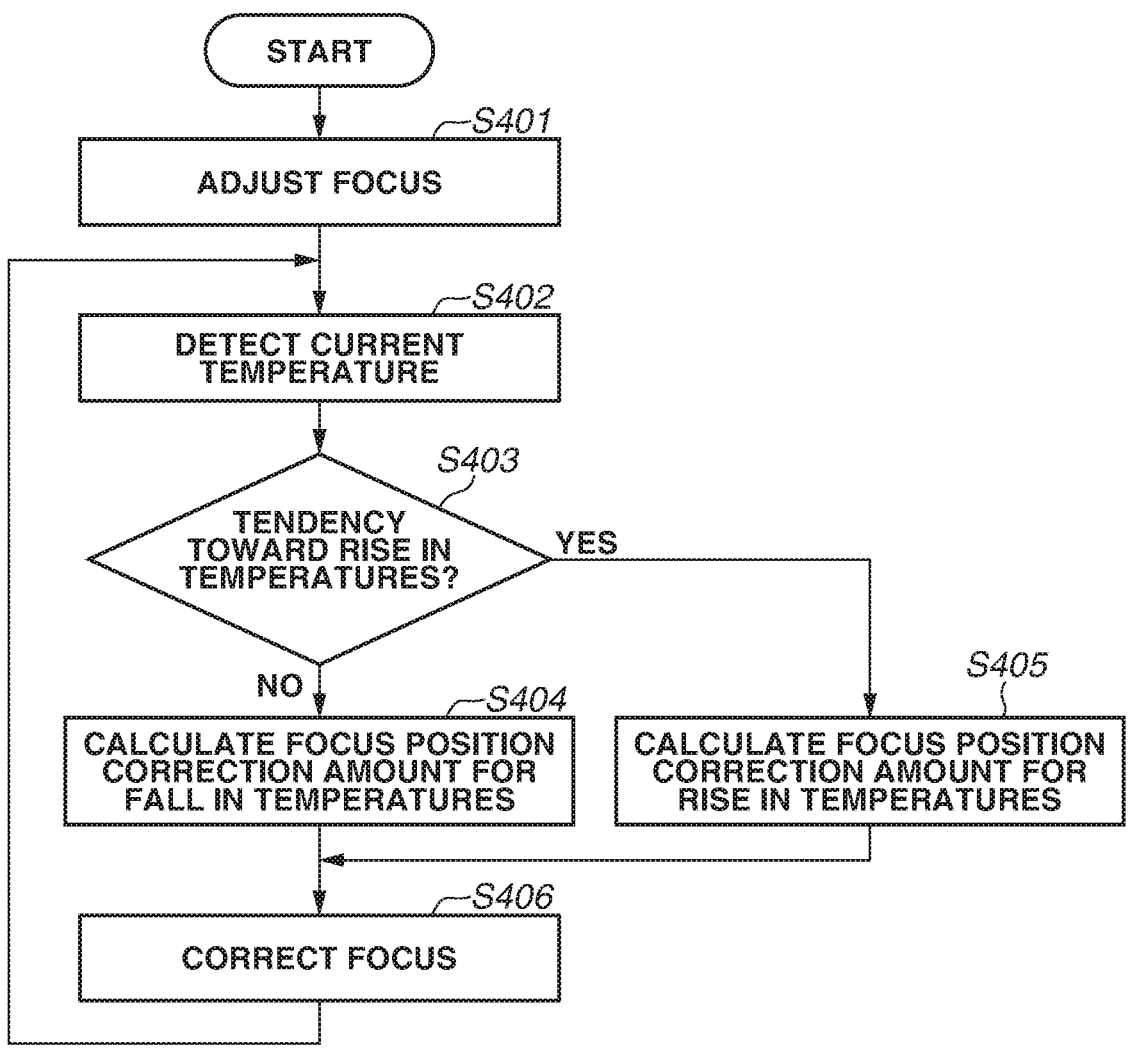
FIG. 3 is a flowchart illustrating focus position correction processing according to a first exemplary embodiment.

The lens control by which defocusing caused by temperature change is corrected to a focusing state much closer to the original focusing state can be executed by executing the processing flow illustrated in FIG. 3 described in the first exemplary embodiment after executing the above processing.

First, in step S501, the optical control unit 312 detects attachment of the lens. Then, the storage unit 314 acquires lens data output from the lens newly attached to the imaging apparatus. Examples of the lens data includes unique information for identifying the lens and a correction coefficient appropriate for the attached lens.

Then, in step S502, the camera control unit 310 judges whether the lens data is acquired.

In a case where the lens data is acquired (YES in step S502), the processing proceeds to step S503. In step S503, the camera control unit 310 determines a correction parameter based on the lens data. If the lens data is lens identification information, the correction amount is referred and used based on the identification information. Further, if the correction coefficient appropriate for the lens can be acquired as the lens data, that correction coefficient is used.

The correction parameter which is used in this process may be retained by the interchangeable lens, the camera main unit, or an external control apparatus, such as a personal computer (PC) for executing camera operation.

Alternatively, correction information applicable to the unique information may be searched through the network when the unique information of the lens is transmitted. This configuration allows use of correction information to be always available even if the camera main unit does not retain the correction information of various devices.

If the lens data can be acquired through the above-described method, correction is executed according to the flowchart of FIG. 3 based on that acquired lens data.

On the other hand, if the lens data cannot be acquired (NO in step S502), the processing proceeds to step S504. In step S504, the camera control unit 310 determines a correction stop parameter as a correction parameter for not making correction. For example, the correction coefficient K is set as "0" (K=0). The above processing is executed because of the following reasons. In a case where the lens data cannot be acquired, it is not possible to decide how much correction should be made in what condition. If correction is executed in such a state, image blur may even occur. Further, the attached lens may be a lens of such a type that execution of focus position correction according to temperatures is not taken into consideration. In such a case, defocusing may be even worsened if correction is executed. Because of the above reasons, in the present exemplary embodiment, correction will not be executed if the lens data cannot be acquired.

<Effect of Second Exemplary Embodiment>

In the present exemplary embodiment, when the optical member is attached, correction is not executed in a case where data of the optical member cannot be acquired. With this configuration, it is possible to avoid defocusing being worsened by executing correction. Further, in a case where data of the optical member can be acquired, correction is executed based on the acquired data. Through the above-described processing, even in a case where defocusing occurs in different manners depending on the tendency of temperature change, it is possible to execute lens control by which defocusing caused by temperature change is corrected to a focusing state much closer to the original focusing state.

Figure 5:
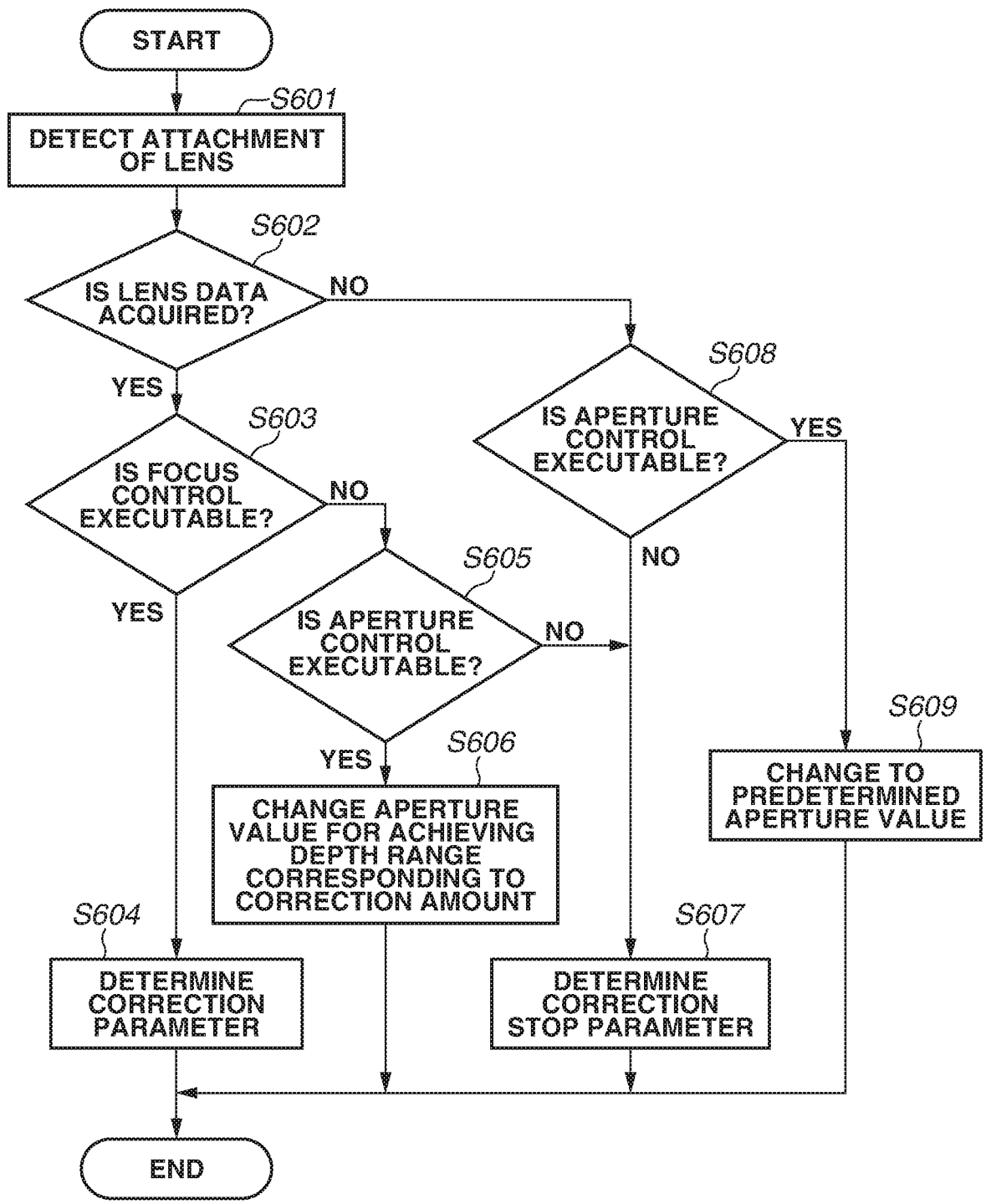
FIG. 5 is a flowchart illustrating selection processing of a focus position correction parameter (correction coefficient K) according to a third exemplary embodiment.

Further, FIG. 5 is a flowchart illustrating processing in which focus position correction through aperture control is further taken into consideration in addition to the processing illustrated in the flowchart illustrated in FIG. 4.

Similar to the processing flow illustrated in FIG. 4, the lens control by which defocusing caused by temperature change is corrected to a focusing state much closer to the original focusing state can be executed by executing the processing flow in FIG. 3 after executing the processing in FIG. 5.

Herein, description of the configuration different from the second exemplary embodiment will be mainly given while description of the configuration common thereto is omitted.

First, in step S601, the optical control unit 312 detects attachment of the lens. In this process, the optical control unit 312 acquires lens data if available.

Then, in step S602, the camera control unit 310 decides whether the lens data is acquired.

In a case where the lens data is acquired (YES in step S602), the processing proceeds to step S603. In step S603, the camera control unit 310 decides whether focus control is executable.

If the focus control is decided as executable (YES in step S603), the processing proceeds to step S604. In step S604, the camera control unit 310 determines the correction parameter according to the flow process of FIG. 3, and ends the processing thereafter.

On the other hand, in a case where the focus control is not executable although the lens data is acquired (NO in step S603), the processing proceeds to step S605. In step S605, the camera control unit 310 decides whether aperture control is executable.

In a case where the camera control unit 310 decides that the aperture control is executable (YES in step S605), the processing proceeds to step S606. In step S606, the camera control unit 310 changes the aperture value to an aperture value for achieving a depth range corresponding to the correction amount and ends the processing flow illustrated in FIG. 5.

In a case where the camera control unit 310 decides that aperture control is also not executable (NO in step S605), the processing proceeds to step S607. In step S607, the camera control unit 310 sets a parameter for not executing the correction. That is, the camera control unit 310 sets a correction stop parameter. For example, as described in the second exemplary embodiment, the correction coefficient K is set as "0" (K=0).

The processing which is executed when the camera control unit 310 decides that lens data is acquired in step S602 has been described as the above.

On the other hand, in a case where the camera control unit 310 decides that lens data cannot be acquired (NO in step S602), the processing proceeds to step S608. Similar to the case described in the second exemplary embodiment, if the correction is executed by changing a focus position when the correction amount for the lens is unknown, the correction cannot be executed correctly, and defocusing may be even worsened.

Therefore, in the present exemplary embodiment, in a case where the camera control unit 310 decides that the aperture control is executable (YES in step S608), the processing proceeds to step S609. Then, in step S609, instead of executing the focus control, the camera control unit 310 increases the depth by narrowing down the aperture to a predetermined aperture value to execute the focus position correction.

In step S608, in a case where the camera control unit 310 decides that the aperture control is also not executable (NO in step S608), the processing proceeds to step S607. In step S607, the camera control unit 310 sets a correction parameter for not executing the correction.

As described above, the focus position is corrected by narrowing down the aperture. However, specifically, if the correct correction amount is unknown, it is desirable that the aperture be further narrowed down when the amount of temperature change is greater because an amount of defocusing is proportionate to the temperature change.

<Effect of Third Exemplary Embodiment>

In a third exemplary embodiment, whether aperture control is executable is taken into consideration in addition to the processing flow executed in the second exemplary embodiment, and focus position correction is executed by narrowing down the aperture if it is better not to execute correction.

With this configuration, correction can be executed even if the lens is an interchangeable lens from which the lens data cannot be acquired. Further, even in a case of a camera in which the focus control cannot be executed, defocusing can be corrected by using the aperture. Therefore, defocusing can be corrected with respect to lenses of various types in comparison to the second exemplary embodiment.

In the above-described exemplary embodiments, lens control by which defocusing caused by temperature change is corrected to a focusing state much closer to the original focusing state can be executed by correction according to an optical member while a tendency of temperature change is taken into consideration.

In a fourth exemplary embodiment, description will be given for a method in which the extent to which temperature environment of the camera main unit or the optical member has experienced is stored as a history, and a correction coefficient is changed according to the temperature experienced in the past.

The correction coefficient is changed according to the experienced temperature because of the following reason. Suppose that the optical member has been exposed to an environment having a high temperature of predetermined degrees or more, it means that the processing having an effect similar to the effect achieved by the annealing processing is performed on the optical member and distortion of the optical member is therefore removed. The annealing processing is heat processing in which internal distortion of an optical member arising in the course of cooling down the resinous material at molding of the optical member, such as a lens barrel, is removed by applying heat. Therefore, an amount of defocusing caused by temperatures is changed depending on whether the optical member has been exposed to the environment having a high temperature of predetermined degrees or more (i.e., depending on whether the high-temperature processing has been executed).

<Decision of High-Temperature Processing>

Figure 6:
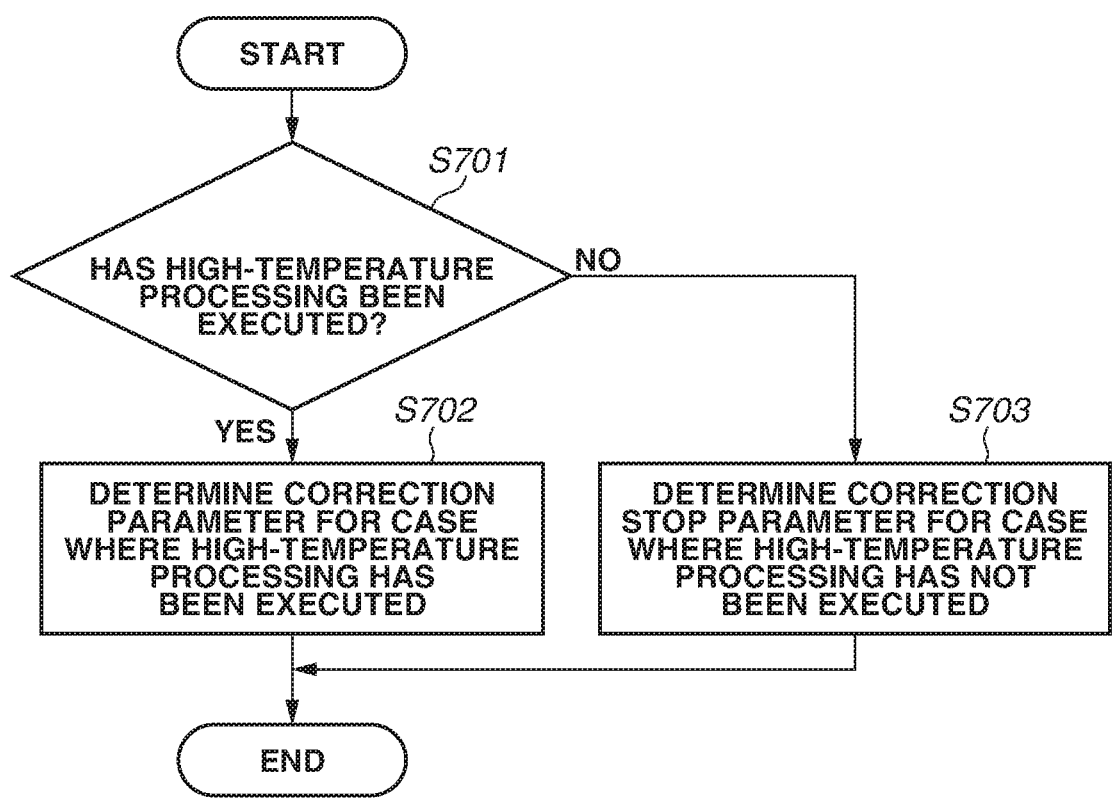
FIG. 6 is a flowchart illustrating determination processing of high-temperature processing according to a fourth exemplary embodiment.

FIG. 6 is a flowchart illustrating a decision flow of high-temperature processing in the present exemplary embodiment.

Herein, description of the configuration different from the above-described exemplary embodiments will be mainly given while description of the configuration common thereto is omitted.

First, in step S701, the camera control unit 310 decides whether high-temperature processing has been executed. The camera control unit 310 stores the highest temperature from among the temperatures detected by the temperature detection unit 313 in the past and therefore can decide whether the high-temperature processing has been executed. Alternatively, the camera control unit 310 may store information indicating that the environment has had a temperature of predetermined degrees or more so that the camera control unit 310 makes the above decision.

In a case where the camera control unit 310 decides that the high-temperature processing has been executed (YES in step S701), the processing proceeds to step S702. In step S702, the camera control unit 310 determines the correction parameter for the case where the high-temperature processing has been executed. In a case where the camera control unit 310 decides that the high-temperature processing has not been executed (NO in step S701), the processing proceeds to step S703. In step S703, the camera control unit 310 determines the correction stop parameter for the case where the high-temperature processing has not been executed. The correction stop parameter is a parameter used for the control of not executing the correction.

Further, it is much desirable that the camera control unit 310 decide how long the high-temperature state has been maintained (high-temperature processing period). For example, a different focus position correction amount is used for the case where the time equal to or greater than a predetermined time has or has not passed after the temperature has reached a high temperature of predetermined degrees or more. Specifically, in a case where the high-temperature state has been maintained for a predetermined time or more, the correction coefficient is set to be smaller in comparison to the case where the high-temperature state has been maintained for less than the predetermined time.

Further, when the optical member has experienced a high-temperature, internal distortion of the optical member arising in the course of cooling down the resinous material at molding of the optical member, such as a lens barrel, can be removed by applying heat. Therefore, it is desirable that the correction amount be set to be smaller than in the case where the high-temperature processing has not been executed thereon.

<Effect of Fourth Exemplary Embodiment>

In the present exemplary embodiment, a different focus position correction amount is used for the case where high-temperature processing has been executed in comparison to the case where high-temperature processing has not been executed. This is because the deviation of the member is removed after high-temperature processing is executed.

With this configuration, in the present exemplary embodiment, it is possible to avoid a focus position being corrected excessively.

According to the second exemplary embodiment, in the camera system to which optical members including a lens group 301 can be detachably attached, focus position correction is executed by using a focus position correction parameter (correction coefficient K) appropriate for each lens. In a fifth exemplary embodiment, in connection with the above, a retaining method of data of a focus position correction parameter (correction coefficient K) appropriate for each lens will be further described.

<Issue addressed by Fifth Exemplary Embodiment>

In the above-described exemplary embodiment, for example, a different correction coefficient K is used according to whether the temperature has a tendency to rise or fall. However, in the above, an effect of difference in magnitude of the temperature change amount $\Delta T$ per unit time has not been taken into consideration.

A tendency of expansion and contraction of a lens barrel member may be different depending on whether the temperature change amount $\Delta T$ per unit time is large or small, i.e., depending on whether a temperature difference is large or small. For example, even if a rise in temperatures occurs in the same member, in a case where the temperature change amount $\Delta T$ is a first temperature difference, a temperature may be changed moderately in comparison to the case where the temperature change amount $\Delta T$ is a second temperature difference that is greater than the first temperature difference.

Specifically, in a case where the lens barrel is configured of a plurality of members, changes of respective members are integrated, and thus the tendency of expansion and contraction of the lens barrel may be changed remarkably according to the magnitude of the temperature difference.

Therefore, depending on a timing of expansion and contraction of the plurality of members caused by the temperature change, even if the temperature change is eventually the same, a state of expansion and contraction may be different according to a group of members including a member that is easily affected by the temperature change and a members that is less affected by the temperature change.

For example, in a case where the temperature has changed from 20° C. to 30° C. when a correction coefficient corresponding to a temperature difference of 5° C. is retained, defocusing may not always be corrected even if a focus position correction amount calculated by simply doubling the correction coefficient is used.

<Processing Flow of Focus Position Correction in Fifth Exemplary Embodiment>

In the present exemplary embodiment, description will be given for a method in which a plurality of correction coefficients in which magnitude of a temperature difference per unit time is taken into consideration is retained, and a correction coefficient corresponding to a detected temperature difference is selected to correct defocusing.

In the present exemplary embodiment, for example, the storage unit 314 stores a correction table that includes a correction coefficient K2 which is used in a case where the temperature is changed by a first temperature difference (e.g., 10° C.) per unit time (e.g., 1 hour) and a correction coefficient K3 which is used in a case where the temperature is changed by a second temperature difference (e.g., 5° C.) that is less than the first temperature difference. In the present exemplary embodiment, at least any one of the correction coefficients K2 and K3 is used to set the correction coefficient according to magnitude of the temperature difference per one hour or per a fraction of an hour, and defocusing is corrected by using that correction coefficient.

The correction table may be previously stored in the storage unit 314. Alternatively, the correction table may be acquired from a detachable lens unit.

Figure 8:
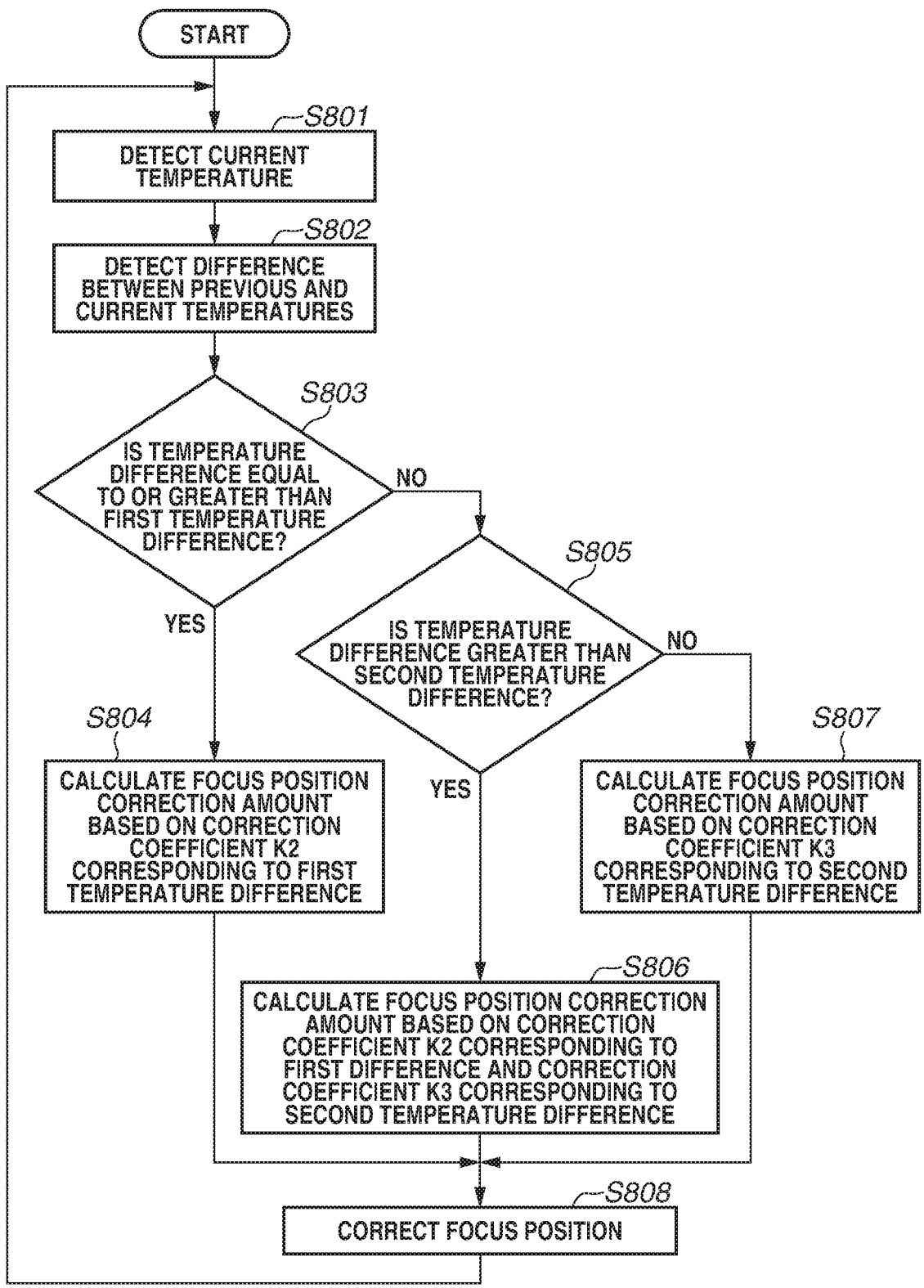
FIG. 8 is a flowchart illustrating focus position correction processing according to a fifth exemplary embodiment.

A specific example will be described with reference to the flowchart illustrated in FIG. 8. First, in step S801, the temperature detection unit 313 detects the current temperature.

Next, in step S802, the camera control unit 310 detects a temperature difference between the temperature acquired prior to the latest step S801 (in the present exemplary embodiment, a temperature acquired from previous temperature detection is taken as an example) and the temperature detected in step S801. Herein, processing for the case where an absolute value of the temperature difference is detected will be described.

In step S803, the camera control unit 310 decides whether the temperature difference detected in step S802 is equal to or greater than the first temperature difference (i.e., first change amount). In a case where the camera control unit 310 decides that the temperature difference is equal to or greater than the first temperature difference (YES in step S803), the processing proceeds to step S804. In step S804, the camera control unit 310 calculates the focus position correction amount by using the correction coefficient K2. A calculation method similar to the calculation method described in the above-described exemplary embodiment will be used as the calculation method of the focus position correction amount.

Focus Position Correction Amount $C=(\Delta T \times K)/\text{ppm}$

In a case where the temperature difference is less than the first temperature difference (i.e., less than the first change) (NO in step S803), the processing proceeds to step S805. In step S805, the camera control unit 310 further decides whether the temperature difference is greater than the second temperature difference (i.e., greater than the second change amount). In a case where the temperature difference is greater than the second temperature difference (YES in step S805), the processing proceeds to step S806. In step S806, the camera control unit 310 calculates the focus position correction amount using the correction coefficient K2 corresponding to the first temperature difference and a correction coefficient K3 corresponding to the second temperature difference. In this case, the camera control unit 310 may calculate the focus position correction amount after calculating more appropriate correction coefficient by executing interpolation processing using the correction coefficients K2 and K3 according to the temperature difference detected in step S801. For example, in a case where the first and the second temperature differences are 5° C. and 10° C. while a detected temperature change is 7.5° C., the camera control unit 310 may calculate an intermediate value of the correction coefficients K2 and K3 to set the intermediate value as the correction coefficient.

In a case where the temperature difference is equal to or less than the second temperature difference (the second change amount) (NO in step S805), the processing proceeds to step S807. In step S807, the camera control unit 310 calculates the focus position correction amount using the correction coefficient K3.

Then, the camera control unit 310 controls execution of focus position correction based on the focus position correction amount calculated in step S804, S806, or S807.

After the processing is executed in step S808, the processing returns to step S801 and the flow is repeated. By constantly detecting temperatures and repeatedly executing the focus position correction, defocusing caused by temperatures can be corrected as appropriate.

In order to describe the present exemplary embodiment in a simplified manner, an exemplary embodiment in which correction coefficients corresponding to the first and the second temperature differences are retained has been described. Alternatively, the correction coefficients respectively corresponding to temperature differences of three or more may be retained.

In the present exemplary embodiment, an absolute value of the temperature difference is detected. Alternatively, a positive (+) and a negative (−) of the temperature difference may be detected. In other words, a rise or a fall of temperatures may be detected. In such a case, as a correction table for the correction coefficients K2 and K3 described above, the storage unit 314 may store a table including correction coefficients for a rise and a fall of temperatures.

Further, the correction coefficients K2 and K3 may be set so as to make the correction amount per one temperature difference become greater in the case where the correction coefficient K2 is used than in the case where the K3 is used. This is because magnitude of defocusing is likely to be greater when the temperature difference is large in comparison to the case where the temperature difference is small.

<Effect of Fifth Exemplary Embodiment>

In the present exemplary embodiment, a method of executing focus position correction using a correction coefficient in which magnitude of a temperature difference is taken into consideration has been described. With this method, defocusing can be corrected with higher precision even in a case where magnitude of defocusing is different depending on the magnitude of the temperature difference.

In the second exemplary embodiment, in the camera system to which optical members including a lens group 301 can be detachably attached, focus position correction is executed using a focus position correction parameter (correction coefficient K) appropriate for each lens. In connection with the above, in a sixth exemplary embodiment, focus position correction is executed while a time lag until the temperature detected by the temperature sensor is transmitted to the lens is taken into consideration.

<Problem to be solved by Sixth Exemplary Embodiment>

Generally, temperature change that causes the focus position to be changed occurs because of the following two reasons: temperature change occurring in the installation environment and heat generated by the imaging apparatus itself.

For example, temperatures in the installation environment may change in the morning and the evening, or may be changed by air conditioning. Further, for example, a power circuit and an imaging engine for executing image processing can be a heat source in the imaging apparatus. A timing at which the temperature change is transmitted to the lens barrel becomes different depending on a distance from the heat source or how the lens barrel is connected to the heat source.

In a case where the heat source is in the imaging apparatus main unit, delay in temperature change may occur when the lens barrel attached to the imaging apparatus has a long length and the member used for the lens barrel has low heat conductivity.

For example, when the temperature sensor is provided to the imaging apparatus main unit, the temperature sensor detects, updates, and acquires the temperature according to heat generation of the camera main unit.

However, if the entire length of the interchangeable lens has a long length or low heat conductivity, it will take time for a temperature of the entire interchangeable lens to reach a temperature calculated by the temperature sensor provided on the imaging apparatus main unit and to become steady.

Figure 9:
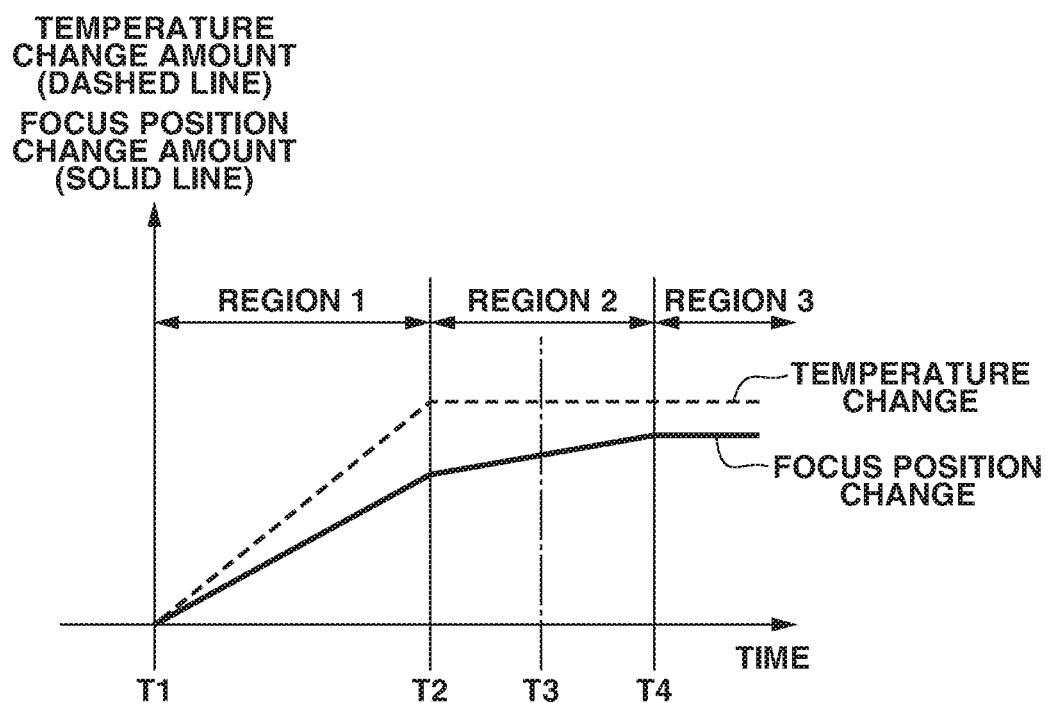
FIG. 9 is a graph illustrating a relationship between a temperature change amount and change in focus position of a lens attachable to a camera.

FIG. 9 is a graph illustrating a relationship between a temperature change amount and a focus position change.

In a region 1, the temperature detected by the temperature sensor (dashed line) rises, and a focus position is also changed (solid line) according to the rise. In a region 2, although a temperature of a heat source has become stable and steady and temperature change detected by the temperature sensor has become constant, defocusing further occurs because the heat has not been transmitted to the lens completely. In a region 3, the heat has been completely transmitted to the lens, so that change of the focus position is stopped.

As described above, because a time lag may occur until the temperature detected by the temperature sensor is transmitted to the lens, defocusing may not be corrected with high precision if the focus position is corrected by simply making the temperature change as a reference. For example, in a case where defocusing is corrected at a time T2 based on the temperature change amount $\Delta T$ from a time T1 without taking a time lag of the heat transmission occurring in the regions 1 and 2 in FIG. 9 into consideration, defocusing may occur at the Time T2 because the focus position is corrected to the focus position of the time T4.

<Processing of Focus Position Correction in Sixth Exemplary Embodiment>

In consideration of the above-described situation, in the present exemplary embodiment, defocusing is corrected while a time lag until the heat is transmitted to the lens barrel after the temperature sensor detects a rise in temperatures (delay in heat transmission) is taken into consideration.

For example, in the present exemplary embodiment, the storage unit 314 stores a correction table including a correction coefficient K4 as a correction coefficient of the region 1 illustrated in FIG. 9 and a correction coefficient K5 as a correction coefficient of the region 2 illustrated in FIG. 9. In the present exemplary embodiment, a correction coefficient is selected while delay in heat transmission is taken into consideration and focus position correction is executed.

The correction table may be previously stored in the storage unit 314, or may be acquired from a detachable lens unit.

Figure 10:
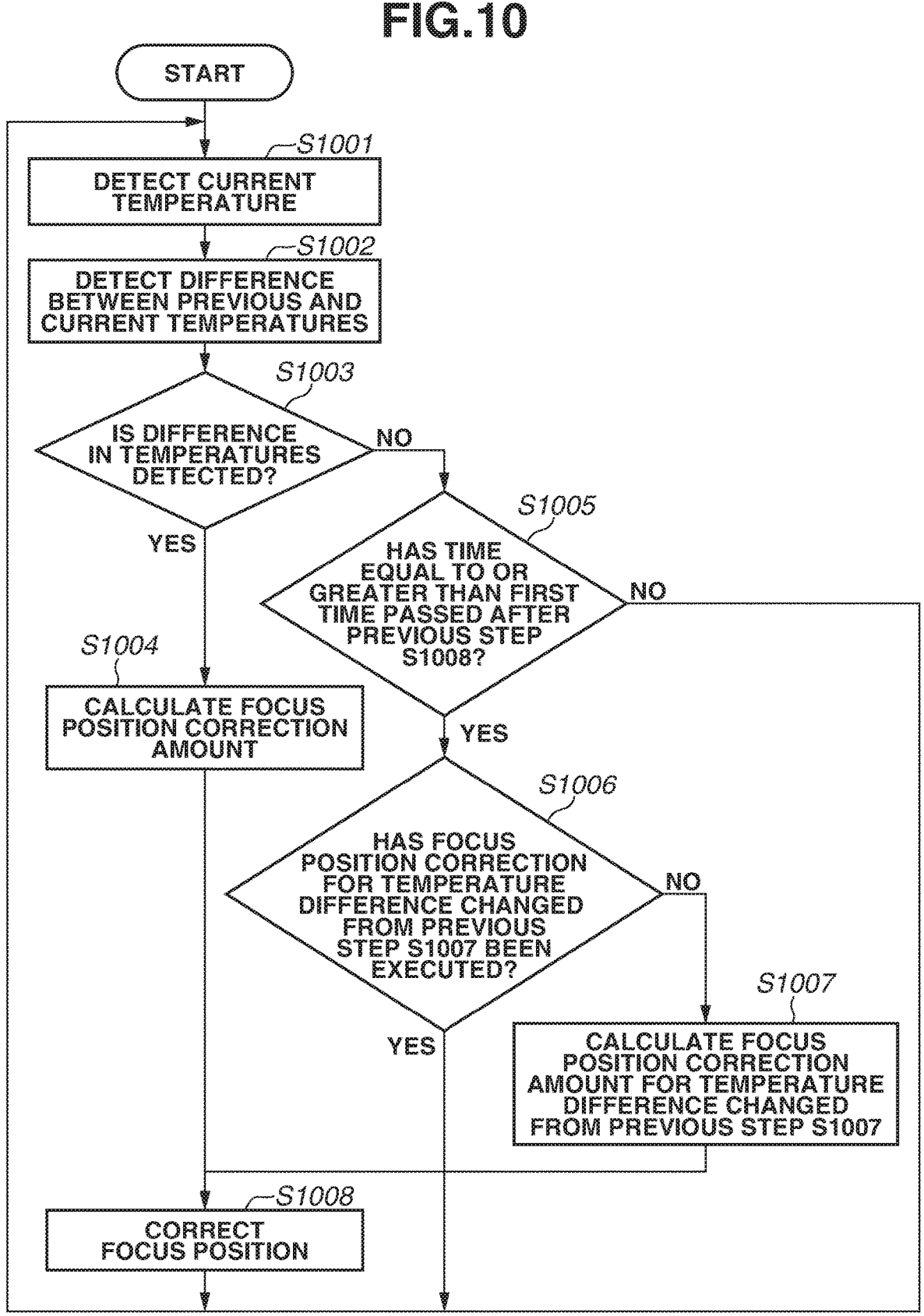
FIG. 10 is a flowchart illustrating focus position correction processing according to a sixth exemplary embodiment.

A specific example will be described with reference to the flowchart in FIG. 10. First, in step S1001, the temperature detection unit 313 detects the current temperature.

Next, in step S1002, the camera control unit 310 compares the current temperature with the temperature acquired prior to the latest step S1001. In the present exemplary embodiment, the camera control unit 310 calculates a temperature difference between the temperatures detected in the current process and the previous process.

Then, in step S1003, the camera control unit 310 decides whether the temperature has been changed based on the temperature difference acquired in step S1002.

As a result of the decision in step S1003, in a case where the temperature change is detected (YES in step S1003), it is considered that the above state corresponds to the region 1 illustrated in FIG. 9, and the processing proceeds to step S1004. In step S1004, the camera control unit 310 uses the correction coefficient K4 to calculate a focus position correction amount corresponding to the temperature change amount T calculated in step S1002. A calculation method similar to the calculation method described in the above-described exemplary embodiment will be used as the calculation method of the focus position correction amount.

Focus Position Correction Amount $C=(\Delta T \times K)/\text{ppm}$

On the other hand, in a case where the camera control unit 310 decides that the temperature has not been changed (NO in step S1003), it is necessary to decide whether the temperature change corresponds to the region 2 or 3 illustrated in FIG. 9, so that the processing proceeds to step S1005. In step S1005, the camera control unit 310 further decides whether the time passed after the focus position correction is executed in previous step S1008 is equal to or greater than the first time. In the present exemplary embodiment, the first time corresponds to a time T4 in FIG. 9.

In a case where the camera control unit 310 decides that the time equal to or greater than the first time has passed (YES in step S1005), it is considered that the temperature of the heat source detected by the temperature sensor has become stable and steady, and change of the focus position has also become stable (i.e., a state corresponding to the region 3 in FIG. 9), the processing proceeds to step S1006. In step S1006, the camera control unit 310 further decides whether focus position correction for the temperature difference changed from previous step S1007 (described below) has been executed. If the processing in step S1007 has not previously been executed, the camera control unit 310 decides whether the correction in step S1007 has been executed after the camera control unit 310 decides that the temperature is changed in step S1003.

If the focus position correction for the temperature difference changed from previous step S1007 has been executed (YES in step S1006), it is considered that change of the focus position has become stable (shifted to the region 3 in FIG. 9), so that the focus position correction is not executed.

If the focus position correction for the temperature difference changed from previous step S1007 has not been executed (NO in step S1006), the processing proceeds to step S1007. In step S1007, the camera control unit 310 uses the correction coefficient K5 to calculate the focus position correction amount in order to correct change of the focus position corresponding to the region 2 illustrated in FIG. 9. The camera control unit 310 calculates the focus position correction amount corresponding to the temperature change between the temperature detected in step S1001 immediately before the focus position correction in previous step S1007 and the temperature detected in the latest step S1001. If the processing in step S1007 has not previously been executed, the camera control unit 310 calculates the focus position correction amount based on the temperature difference between the temperature firstly detected in step S1001 and the temperature detected in the latest step S1001.

In step S1005, in a case where the camera control unit 310 decides that the time equal to or greater than the first time has not passed (NO in step S1005), it is considered that the heat has not been completely transmitted to the lens barrel although the temperature of the heat source has become stable (i.e., a state corresponding to the region 2 in FIG. 9), so that correction is not executed.

After the processing is executed in step S1004 or S1007, focus position correction is executed in step S1008. Then, the processing flow is repeated by returning to step S1001. By constantly detecting temperatures and repeatedly executing the focus position correction, defocusing caused by temperatures can be corrected as appropriate. In the present exemplary embodiment, the camera control unit 310 compares the temperature change acquired in step S902 with a predetermined temperature (in the present exemplary embodiment, the third temperature), and decides that the temperature is changed if the acquired temperature difference is equal to or greater than the third temperature.

Further, in the present exemplary embodiment, an absolute value of the temperature difference is detected. Alternatively, a positive (+) and a negative (−) of the temperature difference may be detected. In other words, a rise and a fall of temperatures may be detected. In such a case, as a correction table of the correction coefficients K2 and K3 described above, the storage unit 314 may store two types of correction coefficients for the cases of a rise and a fall of temperatures.

<Effect of Sixth Exemplary Embodiment>

In the present exemplary embodiment, correction has been executed using the correction coefficient in which a time lag until the temperature detected by the temperature sensor is transmitted to the lens barrel is taken into consideration. With this configuration, even if there is a time lag until the temperature is transmitted to the lens barrel after a rise in the temperature of the installation environment, defocusing can be corrected with higher precision.

Variation Example 1 of Sixth Exemplary Embodiment

The change of the focus position in the region 2 does not always shift in a constant inclination as illustrated in FIG. 9. Therefore, a plurality of threshold values of time may be set with respect to the region 2, and a plurality of correction coefficients K5 may be used according to the passage of time.

Figure 11:
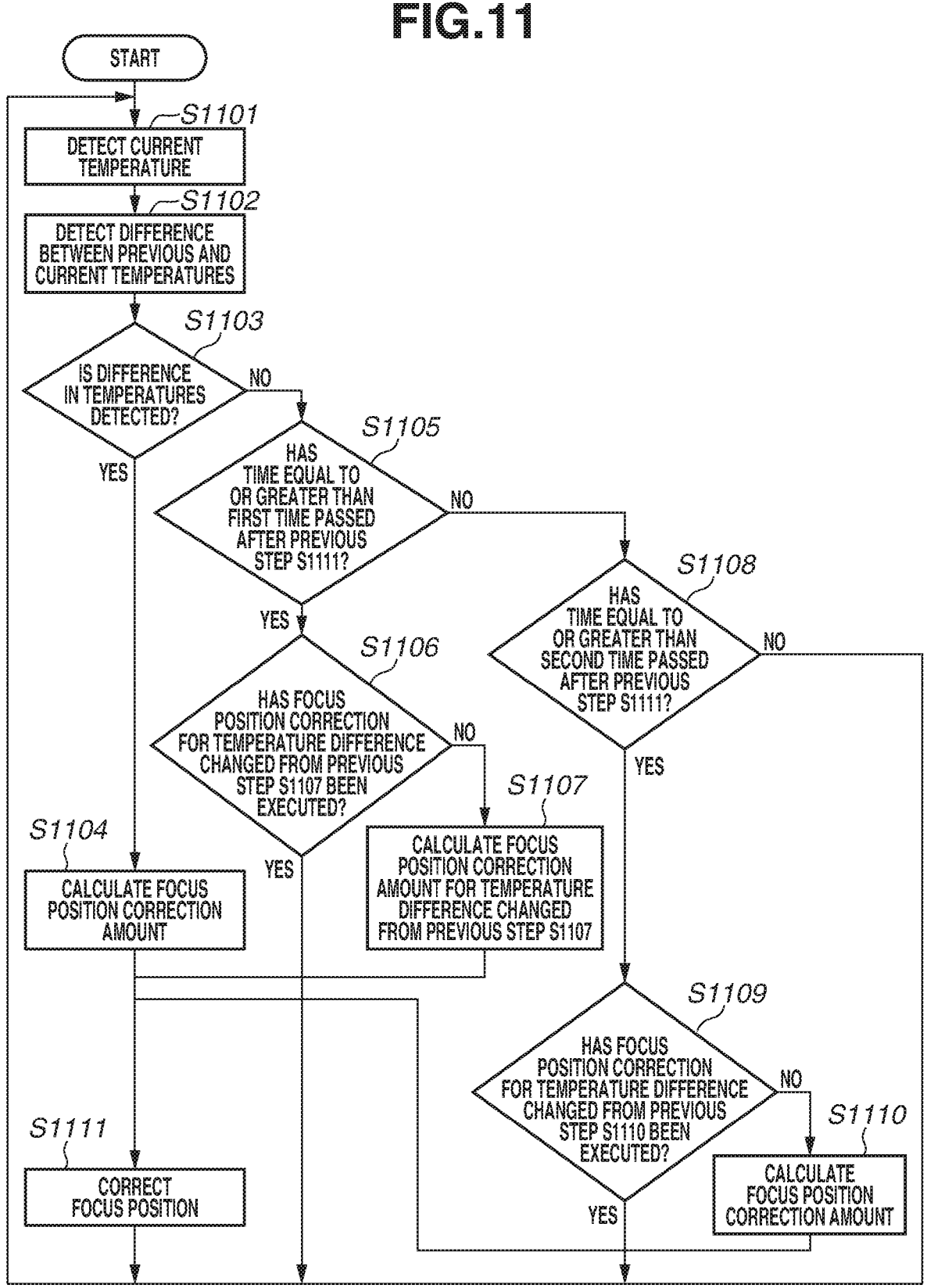
FIG. 11 is a flowchart illustrating focus position correction processing according to a first variation of the sixth exemplary embodiment.

A specific example is illustrated in FIG. 11. FIG. 11 is mainly different from FIG. 10 in that the processing includes steps S1108 to S1110. Description of the processing different from the processing in FIG. 10 will be given.

In step S1103, in a case where the camera control unit 310 decides that the temperature has not been changed (NO in step S1103), the processing proceeds to step S1105. In step S1105, the camera control unit 310 decides whether the time passed after the focus position correction executed in previous step S1111 is equal to or greater than the first time. With respect to the case where the time equal to or greater than the first time has passed (YES in step S1105), subsequent processing is similar to the processing in FIG. 10, so that description thereof is omitted.

If the camera control unit 310 decides that the time equal to or greater than the first time has not passed (NO in step S1105), the processing proceeds to step S1108. In step S1108, the camera control unit 310 decides whether the time passed after the focus position correction executed in previous step S1111 is equal to or greater than the second time. In the present exemplary embodiment, the second time corresponds to the time T3 in FIG. 9. In a case where the time passed after the focus position correction is executed in previous step S1111 is equal to or greater than the second time (YES in step S1108), it is considered that the time T3 in the region 2 has passed, so that the processing proceeds to step S1109.

In step S1109, the camera control unit 310 judges whether focus position correction for the temperature difference changed from previous step S1110 has been executed. In addition, if the processing in step S1110 has not previously been executed, the camera control unit 310 decides whether the correction in step S1110 has been executed after decision of the temperature change made in step S1003. In other words, the camera control unit 310 decides whether correction corresponding to the defocusing occurring at the time T2 to the time T3 illustrated in FIG. 9 has been executed.

In a case where the focus position correction for the temperature difference changed from previous step S1110 has not been executed (NO in step S1109), the processing proceeds to step S1110. In step S1110, the camera control unit 310 calculates the focus position correction amount using the correction coefficient K5. The camera control unit 310 calculates the focus position correction amount corresponding to the temperature change between the temperature detected in step S1101 immediately before the focus position correction in previous step S1110 and the temperature detected in the latest step S1101. If the processing in step S1110 has not previously been executed, the camera control unit 310 calculates the focus position correction amount based on the temperature difference between the temperature firstly detected in step S1101 and the temperature detected in the latest step S1101.

If the camera control unit 310 decides that the time passed after the focus position correction executed in previous step S1111 is not equal to or greater than the second time (NO in step S1108), the time T3 illustrated in FIG. 9 has not passed, so that the correction is not executed.

As described above, a plurality of threshold values of time is set with respect to the region 2, and focus position correction is executed using the correction coefficient according to the passage of time. With this configuration, even if the change of the focus position in the region 2 is not uniform, defocusing can be corrected with higher precision.

Variation Example 2 of Sixth Exemplary Embodiment

In addition, with respect to the region 2, correction may be executed repeatedly by using the same correction coefficient within a predetermined time.

Figure 12:
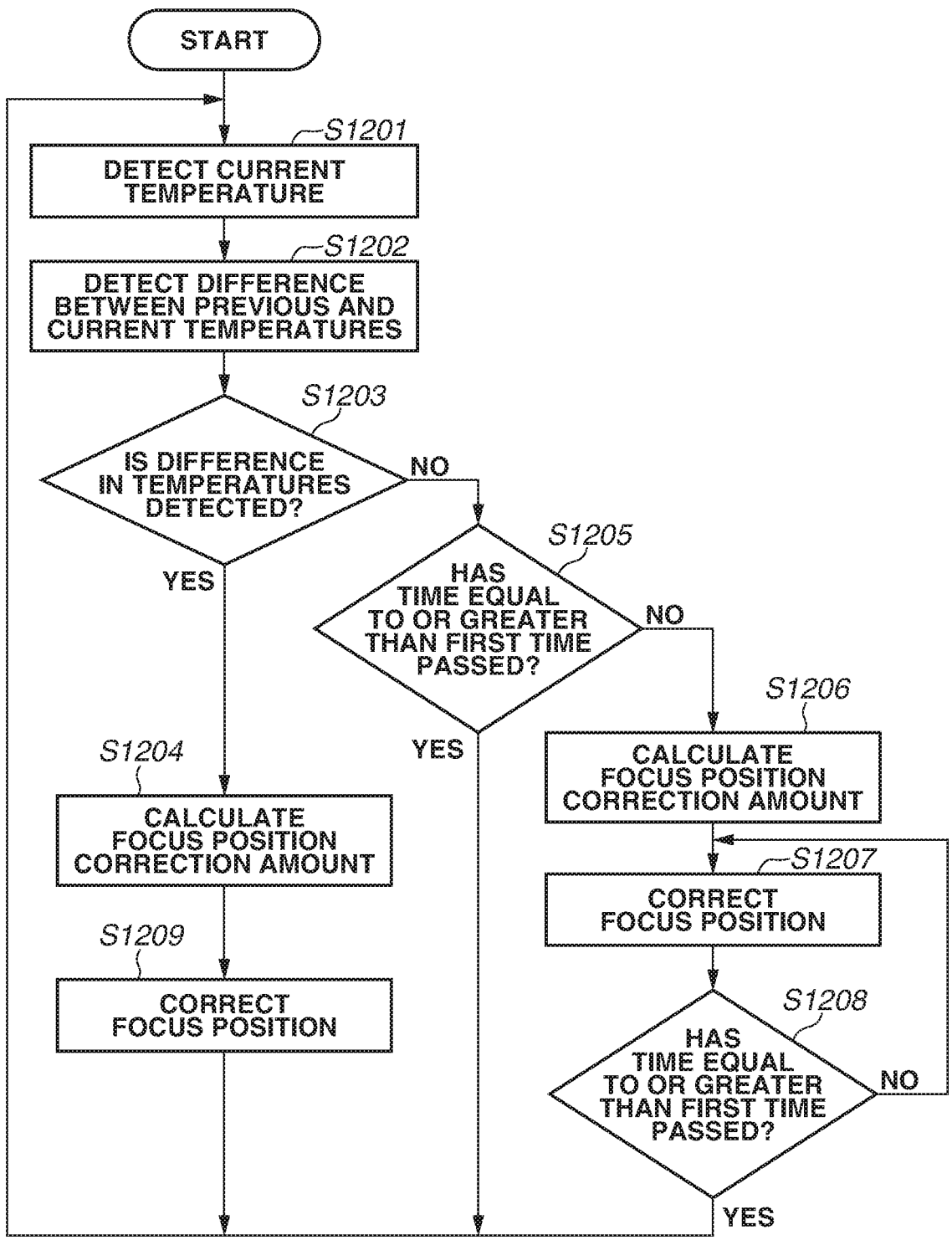
FIG. 12 is a flowchart illustrating focus position correction processing according to a second variation of the sixth exemplary embodiment.

A specific example is illustrated in FIG. 12. FIG. 12 is mainly different from FIG. 10 in that the processing includes steps S1206 to S1208. Further, a correction coefficient smaller than the correction coefficient K5 used in the sixth exemplary embodiment and the variation example 1 of the sixth exemplary embodiment is used as a correction coefficient K5 with respect to the region 2, and focus position correction is repeatedly executed using the correction coefficient K5 until the first time has passed.

Description of the processing different from the processing in FIG. 10 will be given.

In a case where the camera control unit 310 decides that the time equal to or greater than the first time has not passed (NO in step S1205), it is considered that change of the focus position corresponds to a state after the temperature has become stable and steady (i.e., corresponds to the region 2 of FIG. 9), processing proceeds to step S1206 in order to execute focus position correction.

Next, in step S1206, the camera control unit 310 calculates the focus position correction amount using the correction coefficient K5. The camera control unit 310 calculates the focus position correction amount corresponding to the temperature change between the temperature detected in step S1201 immediately before calculation of the focus position correction amount in previous step S1206 and the temperature detected in the latest step S1201. If the processing in step S1206 has not previously been executed, the camera control unit 310 calculates the focus position correction amount based on the temperature difference between the temperature firstly detected in step S1201 and the temperature detected in the latest step S1201.

In step S1207, the camera control unit 310 uses the focus position correction amount calculated in step S1206 to execute the focus position correction.

After executing the focus position correction in step S1207, in step S1208, the camera control unit 310 decides whether the time equal to or greater than the first time has passed. In a case where the time equal to or greater than the first time has not passed (NO in step S1208), the processing returns to step S1207, so that correction in step S1207 is repeated until the time equal to or greater than the first time has passed. In a case where the time equal to or greater than the first time has passed (YES in step S1208), the processing returns to step S1201.

As described above, with respect to the region 2, the correction is minutely and repeatedly executed using the same correction coefficient within a predetermined time, so that focus position correction highly precisely following the change of the focus position can be executed.

In a seventh exemplary embodiment, focus position correction is executed only when it is decided as necessary instead of being executed at any time according to temperatures.

<Issue Addressed by Seventh Exemplary Embodiment>

Basically, it is desirable that focus position correction be executed at any time according to the temperature change. However, for example, if the focus lens is driven at each time when the temperature is changed frequently in order to execute focus position correction, durability thereof may be lowered because of friction of the members.

In the present exemplary embodiment, a method of reducing the frequency of focus position correction accompanied by focus lens driving will be described below.

<Processing of Focus Position Correction in Seventh Exemplary Embodiment>

Figure 13:
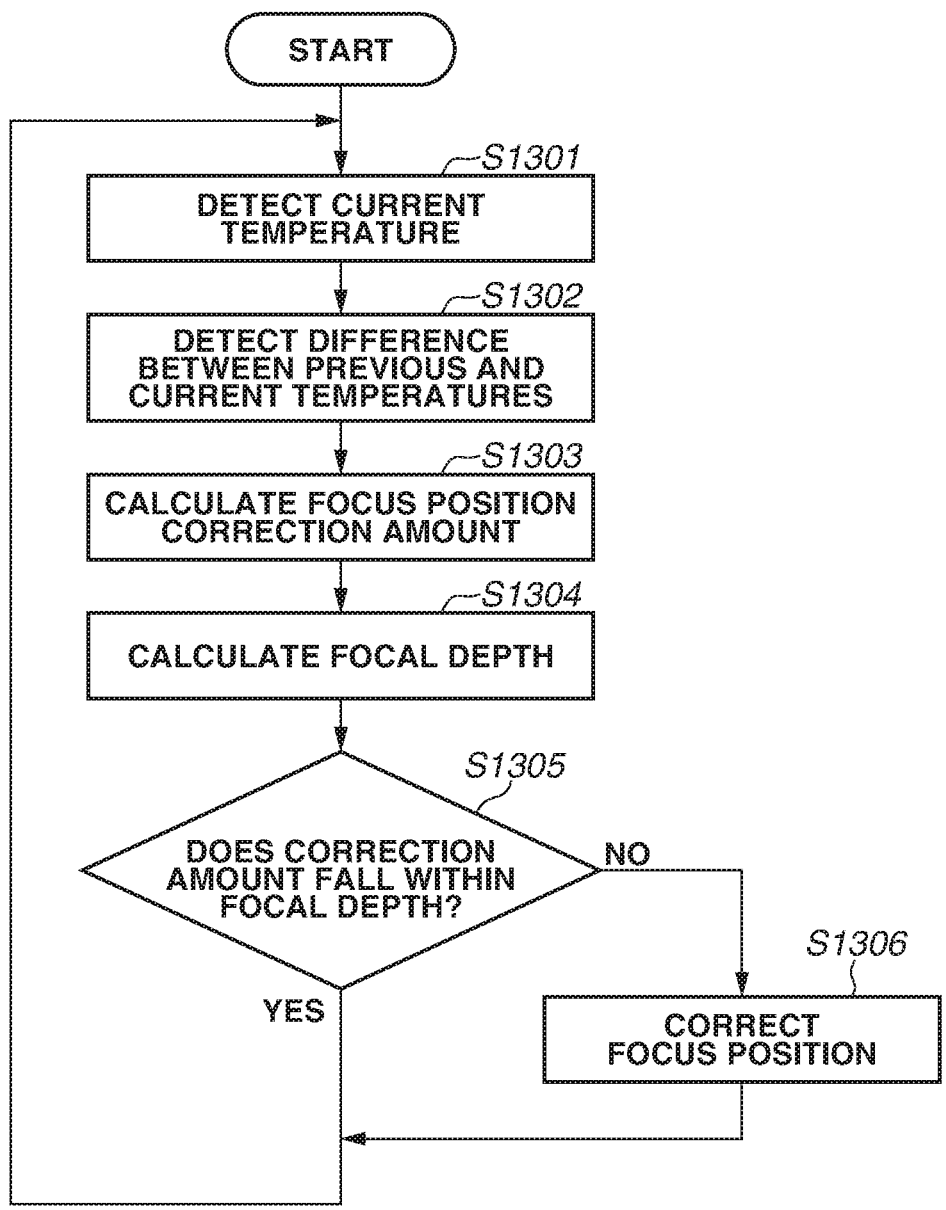
FIG. 13 is a flowchart illustrating focus position correction processing according to a seventh exemplary embodiment.
Figure 14:
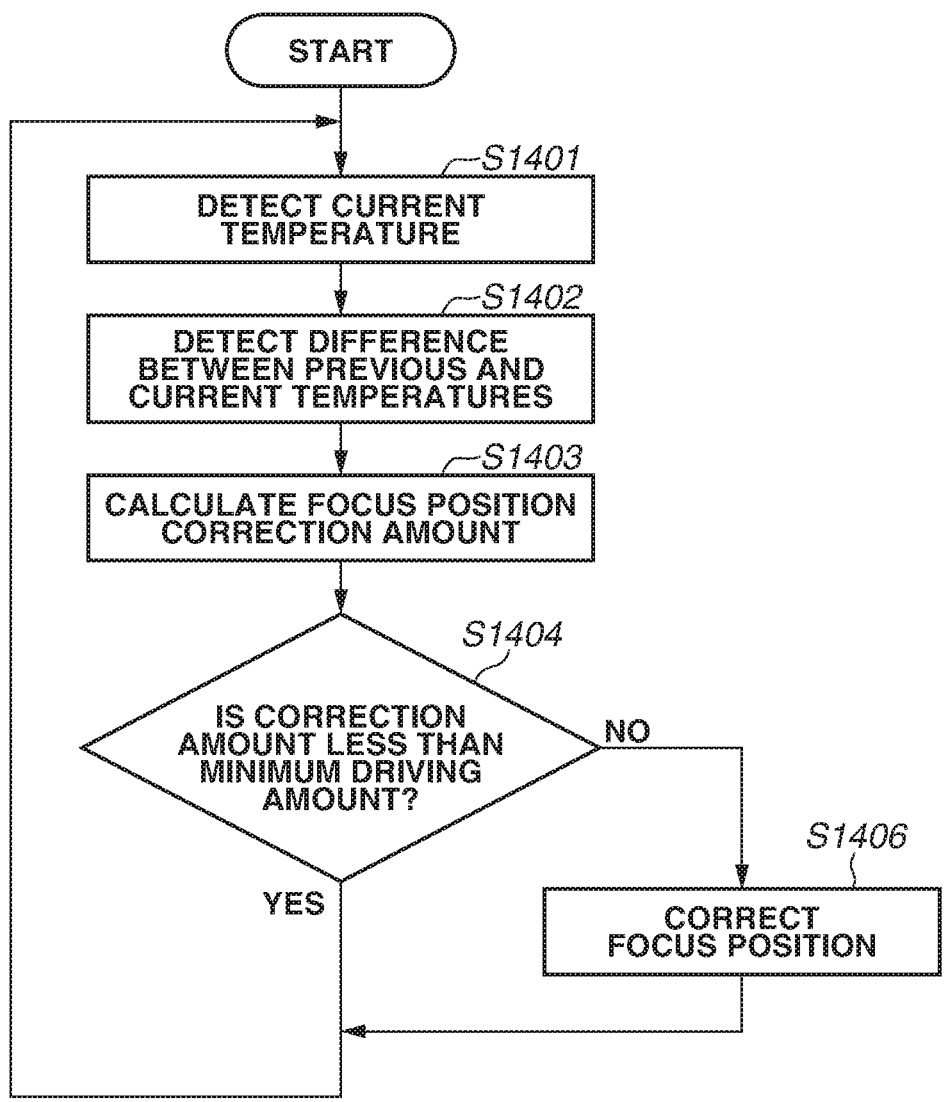
FIG. 14 is a flowchart illustrating focus position correction processing according to an eighth exemplary embodiment.

A specific example will be described with reference to the flowchart in FIG. 13.

First, in step S1301, the temperature detection unit 313 detects the current temperature.

Next, in step S1302, the camera control unit 310 compares the temperature acquired in the latest step S1301 with the temperature information acquired prior to the latest step S1301 and detects the temperature change amount. In the present exemplary embodiment, a temperature difference between the temperatures detected this time and the previous time is calculated.

In step S1303, the camera control unit 310 calculates the focus position correction amount corresponding to the temperature change amount detected in step S1302. The focus position correction amount may be calculated through any of the methods described in the above-described exemplary embodiments.

Next, in step S1304, the camera control unit 310 calculates the current depth information from the current setting state of the camera. For example, the depth information is information indicating a range of a focal depth, which is normally calculated from an F-number and a permissible circle of confusion diameter.

Then, in step S1305, the camera control unit 310 decides whether the calculated focus position correction amount falls within the focal depth.

In a case where the calculated focus position correction amount falls within the focal depth (YES in step S1305), the focus position correction is not executed. This is because defocusing is considered not to cause image blur, or a degree of the blur is considered to fall within the permissible range.

Further, if the focus position correction is not executed because the focus position correction amount is considered to fall within the focal depth in step S1305, the storage unit 314 stores the temperature change detected in step S1302 this time. Then, the camera control unit 310 adds the detected temperature change to the temperature change to be detected in subsequent step S1302, and decides whether the focus position correction amount based on the total temperature change amount falls within the focal depth in subsequent step S1305.

On the other hand, in a case where the camera control unit 310 decides that the focus position correction amount does not fall within the focal depth (NO in step S1305), the processing proceeds to step S1306. In step S1306, the camera control unit 310 executes the focus position correction. This is because certain defocusing which causes image blur is considered to occur.

<Effect of Seventh Exemplary Embodiment>

As described above, in a case where it is decided that the defocus amount falls within the focal depth, defocusing is not corrected. With this configuration, the focus lens can be prevented from being driven more than is necessary. As a result, the object can be brought into focus with higher precision, and durability of the focus lens can be improved further.

Variation Example of Seventh Exemplary Embodiment

Further, although an exemplary embodiment has been described with reference to a simple processing flow, in a case where a depth range is changed (more specifically, a depth is reduced) because of change of the imaging environment (e.g., change of an F-number) during imaging, it is desirable that focus position correction be executed even if the temperature change is not detected. In other words, for example, the camera control unit 310 decides whether the depth range is changed, and executes correction regardless of whether the correction amount falls within the focal depth if there is any change in the depth range. If there is no change in the depth range, the processing in steps S1305 and S1306 is executed.

Further, with respect to a momentary change or an incident where a person passes a field of view during imaging, a dead time in which the lens does not react instantly is provided, so that the driving frequency can be suppressed further.

In an eighth exemplary embodiment, a focus position correction method in which driving characteristics of a focus adjustment mechanism is taken into consideration in addition to the above-described temperatures or an imaging environment will be described.

<Issue Addressed by Eighth Exemplary Embodiment>

As a driving characteristic of the focus adjustment mechanism, for example, when the lens is driven by a stepping motor, there is a case where the lens cannot be driven only with a one-step worth of driving force supplied from the motor because of a mechanical clearance between gears included in the lens barrel.

In such a case, a minimum driving amount is determined with respect to control of the driving system, and driving control is executed by the minimum driving amount or more when driving is actually executed.

In the above-described driving system, even though the temperature is changed, the control cannot be executed if the driving amount is less than the minimum driving amount. If the focus position correction is executed without taking the minimum driving amount into consideration, a focus position is considered to have been corrected even though the focus lens has not been moved in a case where the focus position correction amount is less than the minimum driving amount, so that precision of defocus position correction may be lowered.

Therefore, in the present exemplary embodiment, defocus position correction in which the minimum driving amount is taken into consideration is executed.

<Processing of Focus Position Correction in Eighth Exemplary Embodiment>

A specific example will be described with reference to the flowchart in FIG. 4.

First, in step S1401, the temperature detection unit 313 detects the current temperature.

In step S1402, the camera control unit 310 compares the temperature information acquired prior to the latest step S1401 with the current temperature and detects a temperature change amount. In the present exemplary embodiment, a temperature difference between the temperatures detected this time and the previous time is calculated.

Then, in step S1403, the camera control unit 310 calculates the focus position correction amount based on the temperature change amount detected in step S1402.

Next, in step S1404, the camera control unit 310 decides whether the focus position correction amount calculated in step S1403 is less than the minimum driving amount. In a case where the focus position correction amount is less than the minimum driving amount (YES in step S1404), the focus position correction is not executed.

If the focus position correction is not executed because the focus position correction amount is less than the minimum driving amount, the temperature detected prior to the focus position correction executed in the previous step S1405 and the temperature change amount detected in the latest step S1401 are stored.

Then, the camera control unit 310 adds the stored temperature change amount to the temperature change amount to be detected in subsequent step S1402 to calculate the focus position correction amount.

On the other hand, in a case where the focus position correction amount is equal to or greater than the minimum driving amount (NO in step S1404), the processing proceeds to step S1405. In step S1405, the camera control unit 310 executes the focus position correction.

<Effect of Eighth Exemplary Embodiment>

As described above, in the present exemplary embodiment, defocus position correction with improved precision, in which the driving characteristics of the focus adjustment mechanism is take into consideration, can be executed by executing the focus position correction when the temperature change amount is equal to or greater than the minimum driving amount.

Another Exemplary Embodiment

The above-described exemplary embodiments can be combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-109445, filed May 31, 2016 and Japanese Patent Application No. 2017-051819, filed Mar. 16, 2017, which are hereby incorporated by reference herein in their entirety.

What is claimed is:

1. A control apparatus, to which an interchangeable lens apparatus is attachable, comprising:
   a temperature sensor configured to detect temperature; and
   at least one processor configured to:
      acquire lens data corresponding to an interchangeable lens apparatus attached to the control apparatus;
      store coefficient data in association with the lens data in a memory;
      perform a first calculation to calculate a temperature change amount from a plurality of temperatures detected by the temperature sensor;
      perform a second calculation to calculate a correction amount based on the lens data and a calculation result of the first calculation; and
      control driving of a lens of the attached interchangeable lens apparatus based on the correction amount,
   wherein the lens data is acquired from the attached interchangeable lens apparatus and includes identification information of the attached interchangeable lens apparatus,
   wherein, the at least one processor stores in the memory a first coefficient corresponding to a first change amount and a second coefficient corresponding to a second change amount that is smaller than the first change amount with respect to the lens apparatus,
   wherein, in a case where the temperature change amount calculated by at least one processor in the first calculation is equal to or greater than the first change amount, the at least one processor performs the second calculation to calculate a correction amount using the first coefficient,
   wherein, in a case where the temperature change amount calculated by the at least one processor in the first calculation is equal to or less than the second change amount, the at least one processor performs the second calculation to calculate a correction amount using the second coefficient, and wherein, in a case where the temperature change amount calculated by the at least one processor in the first calculation is less than the first change amount and greater than the second change amount, the at least one processor performs the second calculation to calculate a correction amount using the first coefficient and the second coefficient.

2. The control apparatus according to claim 1, wherein the at least one processor further calculates a correction amount based on a third change amount and a third coefficient calculated by the first calculation, and calculates a correction amount based on the third change amount and a fourth coefficient in a case where a time equal to or greater than a first time has passed after temperature change is calculated by the first calculation, and wherein the at least one processor controls the driving of the lens based on each of the correction amounts.

3. The control apparatus according to claim 1, wherein the at least one processor controls the driving of the lens based on the correction amount calculated by the second calculation based on a third change amount and a third coefficient calculated by the first calculation, and wherein, in a case where temperature change is detected by the first calculation, the at least one processor controls the driving of the lens based on the third change amount and a fourth coefficient which are calculated by the first calculation until a time equal to or greater than a first time has passed.

4. The control apparatus according to claim 1, further comprising:

a memory configured to store coefficient data in association with the lens data, wherein the at least one processor is further configured to detect attachment of the lens apparatus to an imaging apparatus, and wherein the memory stores coefficient data corresponding to the lens apparatus which is detachably attached to the imaging apparatus, and wherein the second calculation calculates a correction amount based on the calculation result of the first calculation and a coefficient of the lens.

5. The control apparatus according to claim 1, wherein, in a case where the correction amount calculated by at least one processor in the second calculation falls within a focal depth, the at least one processor does not control the driving of the lens, and stores the correction amount in a memory.

6. A control method of a control apparatus to which an interchangeable lens apparatus can be attached, the control method comprising:

acquiring lens data corresponding to an interchangeable lens apparatus attached to the control apparatus;

detecting a temperature;

calculating, as first calculation, a temperature change amount from a plurality of temperatures detected in the temperature detection;

calculating, as second calculation, a correction amount based on a calculation result of the first calculation and on the lens data; and controlling driving of a lens based on the correction amount, wherein the lens data is acquired from the attached interchangeable lens apparatus and includes identification information of the attached interchangeable lens apparatus.

7. The control apparatus according to claim 1, wherein the lens data is information for identifying the interchangeable lens apparatus.

8. The control apparatus according to claim 1, wherein the at least one processor acquires the lens data from the attached interchangeable lens apparatus.

9. The control apparatus according to claim 1, wherein, in the second calculation, the at least one processor is-further calculates a correction amount based on a calculation result of the first calculation and the coefficient data stored in association with the lens data.

10. The control apparatus according to claim 1, wherein, in a case where the lens data cannot be acquired, the at least one processor does not control the driving of the lens based on the correction amount.

11. The control apparatus according to claim 1, wherein the at least one processor is further configured to control aperture, and wherein, in a case where the driving of the lens based on the correction amount is unavailable although the lens data was acquired, the at least one processor controls the aperture so as to narrow down the aperture.

12. The control apparatus according to claim 1, wherein the control apparatus is an imaging apparatus.

13. The control apparatus according to claim 12, wherein the imaging apparatus is a camera.

14. The control apparatus according to claim 1, wherein the lens of the interchangeable lens apparatus is a focus lens.

15. A control method for a control apparatus to which an interchangeable lens apparatus is attachable, the control method comprising:

acquiring lens data corresponding to an interchangeable lens apparatus attached to the control apparatus;

acquiring temperature from a temperature sensor configured to detect temperature of the control apparatus attached to the interchangeable lens apparatus;

storing coefficient data in association with the lens data in a memory;

calculating, as a first calculation, a temperature change amount from a plurality of temperatures detected by the temperature sensor;

calculating, as a second calculation, a correction amount based on the lens data and a calculation result of the first calculation; an controlling lens driving of a lens based on the correction amount, wherein the lens data is acquired from the attached interchangeable lens apparatus and includes identification information of the attached interchangeable lens apparatus, wherein, the storing stores in the memory a first coefficient corresponding to a first change amount and a second coefficient corresponding to a second change amount that is smaller than the first change amount with respect to the interchangeable lens apparatus, wherein, in a case where the temperature change amount calculated by the first calculation is equal to or greater than the first change amount, the second calculation calculates a correction amount using the first coefficient, wherein, in a case where the temperature change amount calculated by the first calculation is equal to or less than the second change amount, the second calculation calculates a correction amount using the second coefficient, and wherein, in a case where the temperature change amount calculated by the first calculation is less than the first change amount and greater than the second change amount, the second calculation calculates a correction amount using the first coefficient and the second coefficient.

16. The control method according to claim 15, wherein the lens data is information for identifying the interchangeable lens apparatus.

17. The control method according to claim 15, wherein the acquiring lens data includes acquiring the lens data from the attached interchangeable lens apparatus.

18. The control method according to claim 15, further comprising:

wherein, in the second calculation, the calculating further calculates a correction amount based on a calculation result of the first calculation and the coefficient data stored in association with the lens data.

19. The control method according to claim 15, wherein, in a case where the lens data cannot be acquired during the acquiring, the driving of the lens based on the correction amount is inhibited.

20. The control method according to claim 15, further comprising:

controlling an aperture, and wherein, in a case where the driving of the lens based on the correction amount is unavailable although the lens data was acquired, the controlling controls the aperture so as to narrow down the aperture.

21. The control method according to claim 15, wherein the control apparatus is an imaging apparatus.

22. The control method according to claim 21, wherein the imaging apparatus is a camera.

23. The control method according to claim 15, wherein the lens of the interchangeable lens apparatus is a focus lens.

* * * * *